United States Patent [19]

Volz et al.

[11] Patent Number: 5,388,899
[45] Date of Patent: Feb. 14, 1995

[54] SOLENOID VALVE FOR SLIP-CONTROLLED BRAKE SYSTEMS OF AUTOMOTIVE VEHICLES

[75] Inventors: Peter Volz, Darmstadt, Germany; Marc Timmermans, Leerbeek, Belgium

[73] Assignee: Alfred Teves GmbH, Germany

[21] Appl. No.: 971,930

[22] PCT Filed: Feb. 13, 1992

[86] PCT No.: PCT/EP92/00308

§ 371 Date: Dec. 21, 1992

§ 102(e) Date: Dec. 21, 1992

[87] PCT Pub. No.: WO92/18362

PCT Pub. Date: Oct. 29, 1992

[30] Foreign Application Priority Data

Apr. 19, 1991 [DE] Germany .............. 4112920

[51] Int. Cl.[6] .............................................. B60T 8/36
[52] U.S. Cl. .................. 303/119.2; 137/504; 138/31; 303/87
[58] Field of Search ............ 303/87, 119.2, 116.4; 137/504, 509; 138/30, 31

[56] References Cited

U.S. PATENT DOCUMENTS

| 2,572,270 | 10/1951 | Majneri | 303/87 |
|---|---|---|---|
| 2,828,760 | 4/1958 | Taylor et al. | 138/31 |
| 3,277,924 | 10/1966 | Nezworski | 137/504 |
| 3,381,708 | 5/1968 | Chenoweth | 137/504 |
| 4,620,565 | 11/1986 | Brown | 303/119.2 |
| 4,844,119 | 7/1989 | Martinic | 137/596.17 |
| 5,035,469 | 7/1991 | Geilen et al. | 303/119.2 |

FOREIGN PATENT DOCUMENTS

| 110539 | 6/1984 | European Pat. Off. ......... 303/119.2 |
| 0181643 | 11/1984 | European Pat. Off. . |
| 0361502 | 4/1990 | European Pat. Off. . |
| 2710067 | 9/1977 | Germany .............. 303/119.2 |
| 3513282 | 6/1986 | Germany . |
| 3725810 | 2/1989 | Germany . |
| 3913352 | 10/1990 | Germany . |

*Primary Examiner*—Matthew C. Graham
*Attorney, Agent, or Firm*—Robert P. Seitter; J. Gordon Lewis

[57] ABSTRACT

This invention relates to a solenoid valve where a volume governor which governs the hydraulic flow is inserted coaxially to the valve closure member into the valve accommodating body of the valve. The volume governor is integrated by way of series connection between the first pressure medium connection, emanating from a pressure medium source, and the valve closure member. A reduction of the valve operating noises is ensured with a smallest-requirement-answering structural size, thus the control noises being prevented from propagating over the entire connected system.

6 Claims, 4 Drawing Sheets

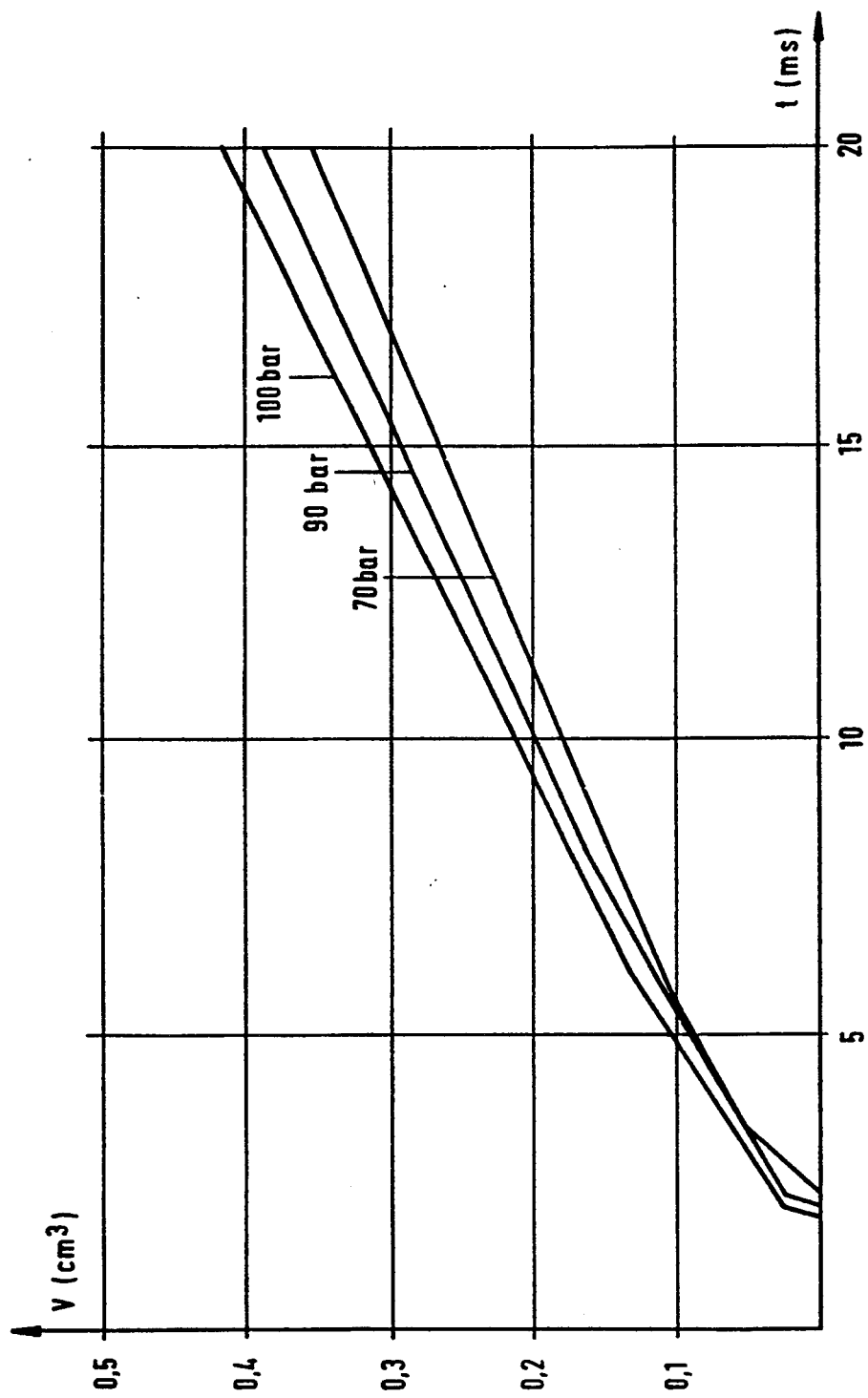

SOLENOID VALVE FOR SLIP-CONTROLLED BRAKE SYSTEMS OF AUTOMOTIVE VEHICLES

BACKGROUND

This invention relates to a solenoid valve, in particular for slip-controlled brake systems of automotive vehicles, having a valve governor integrated into the valve body between a first and second pressure medium connections providing pressure medium volume control.

In industrial hydraulic engineering, there are a variety of applications for solenoid valves for controlling and regulating pressure media. Likewise, the use of solenoid valves in the equipment of vehicles is of great importance since the flows of pressure medium have to be controlled with great precision even in case of extraordinary operating conditions.

When integrating solenoid valves within the vehicle, it is of special importance to consider additional measures, both active and passive, that go beyond the actual operativeness and are a benefit to the pursuit of comfort with regard to easy service and noiselessness of the respective system controlled by solenoid valves.

As regards the desired noiselessness, reference is made, for instance, to the arrangement of pressure pulsation dampers within a valve block for a slip-controlled brake system as is known from German Published Patent Application (=DE-OS) No. 39 13 352. Because of their elastic deformability, these pulsation dampers are able to absorb the noise emissions originating from the switching frequencies of the solenoid valves so that it is possible to lower the noise level felt to be a disturbance. A disadvantage of this method, however, results from the fact that an elastic deformation of the pressure pulsation damper automatically will also result in an undesired increase in the pressure medium volume intake.

It is thus an object of this invention to set forth a solution which effectively reduces the noise level, depending on the solenoid valve operating positions, and its propagation, while maintaining an unaltered simple design of the solenoid valves as far as possible and without having to accept an additional volume intake during operation.

In accordance with this invention, this task is solved by arranging a control piston, which is integrated in the valve accommodating body and which regulates the volume or the pressure, between the pressure medium connection of the pressure medium source and the valve closure member of the solenoid valve which is open in the basic position, when currentless, with the control edge, which is effective on the control piston, adjusting the pressure medium flow in dependence on the piston stroke.

These constructional measures as well as the further characteristics and advantages of the claimed invention will be represented and explained in more detail in the following, reference being made to several drawings.

BRIEF DESCRIPTION OF THE DRAWINGS

FIG. 4 is a diagram, illustrating the pulse volume as a function of the pulse length in consequence of the electromagnetic excitation of the valve.

BRIEF DESCRIPTION OF THE PREFERRED EMBODIMENT

Figure 1:
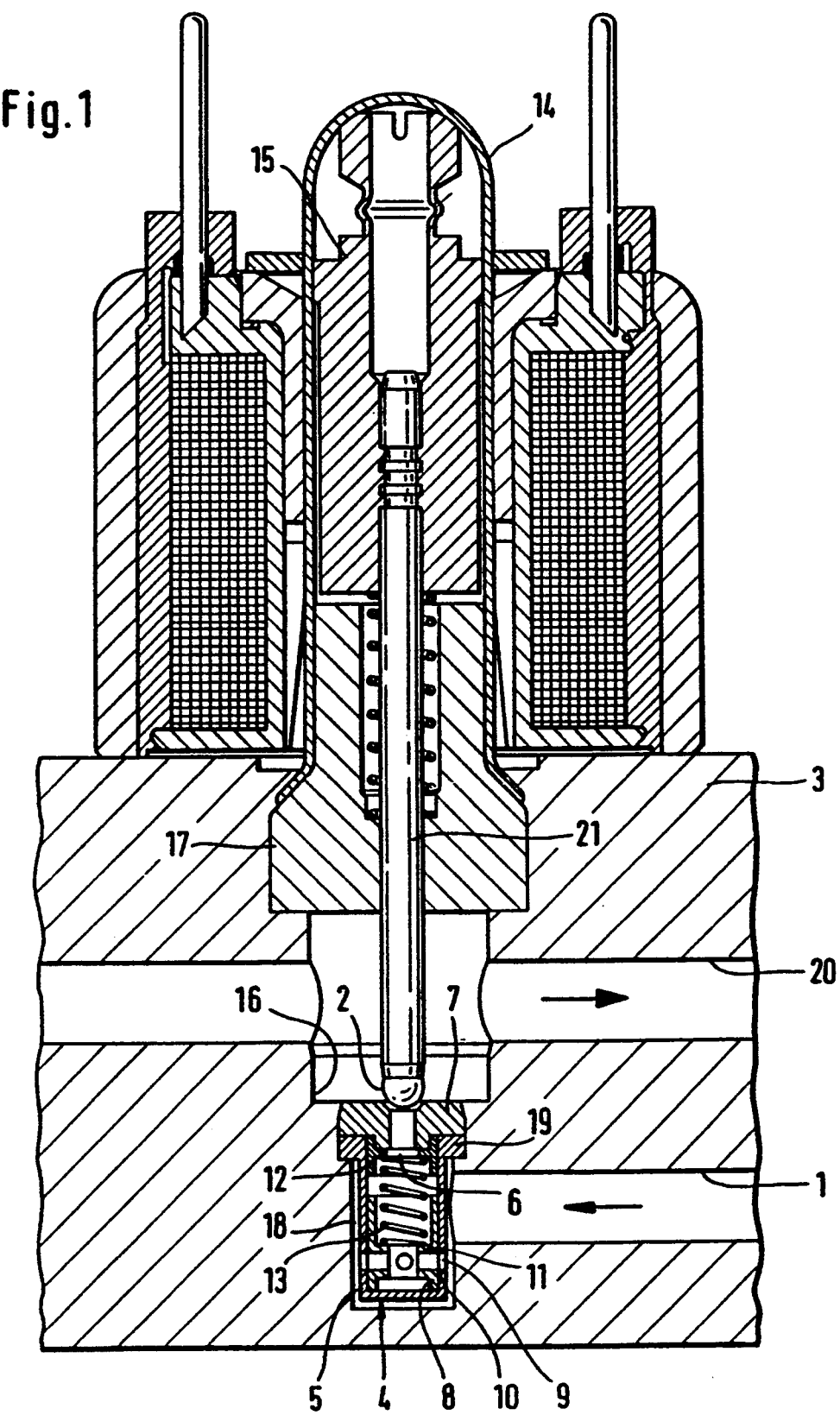
FIG. 1 is a cross-sectional view through a valve unit composed of a solenoid valve and a volume governor.

FIG. 1 shows the cross-section of the solenoid valve with the volume governor 4 arranged coaxially with regard to the valve tappet 21. The solenoid valve has an armature 15 guided in a valve sleeve 14, the valve tappet 21 extending along said armature 15 into the valve accommodating body 3. On the tappet end averted from the armature 15, there is a ball-shaped valve closure member 2 forming an open annular clearance cross-section at the valve seat 7 in the electromagnetically non-excited position. In its open end area, the valve sleeve 14 is caulked to a magnet core 17 in the valve accommodating body 3. Referring to the drawing, the volume governor 4 is illustrated beneath the valve seat 7 disposed in an extension of the stepped bore 16 accommodating the valve seat. The volume governor 4 has a cup-shaped governor housing 5, an annular chamber 18 confining the surface area of said housing 5 with respect to the valve accommodating body 3 in order to ensure an easy pressure medium supply to the pressure medium passages 9, via the control edges 10, from the first pressure medium connection 1 emanating from the pressure medium source—such as via a tandem master cylinder or a pump. The afore-described pressure medium passages 9 are arranged in the cup-shaped end of the governor housing 5. Aligned with pressure medium passages 9 are pressure medium passages of the control piston 8, as long as the same remains abutted on the cup-shaped end of the governor housing 5 under the action of a compression spring 13. Compression spring 13 is clamped by shoulders 11 formed within the control piston 8 and within the insert 12. The coaxial alignment of the volume governor 4 in respect to the valve tappet 21 requires only an extension of the stepped bore 16 in order to clamp the shoulder or collar 19, which is arranged on the governor housing 5, behind the valve seat 7 and the stepped bore 16. Valve seat 7 is to be inserted into the valve accommodating body 3 as a separate piece. It will be expedient to use the shoulder 11 within the insert 12 to support the compression spring 13. Consequently, via the first pressure medium connection 1, the annular chamber 18, the pressure medium passages 9 and via the bore in the insert 12, there exists an unblocked hydraulic communication to the second consumer-side pressure medium connection 20 in the open operating position of the valve as shown in the drawing.

Figure 2:
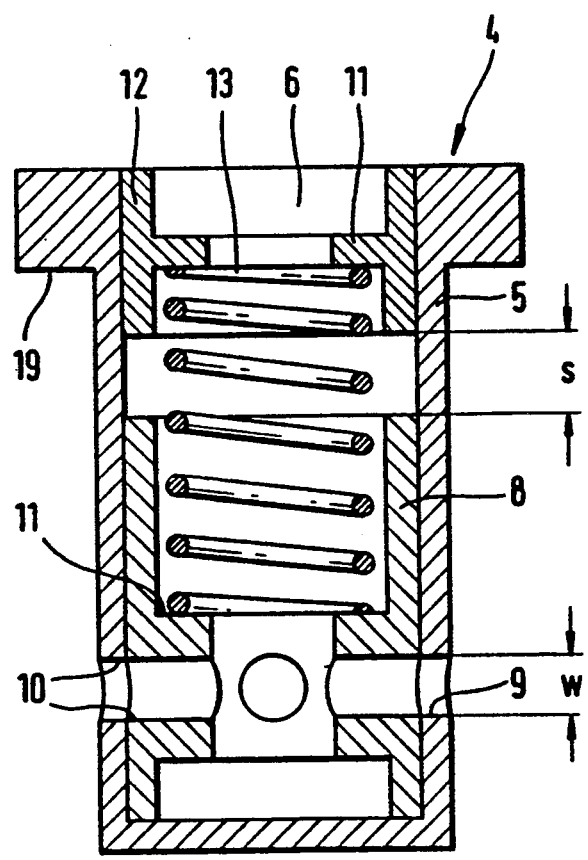
FIG. 2 is an enlarged cross-sectional view of the volume governor shown in FIG. 1.

FIG. 2 shows an enlarged cross-sectional view of the volume governor 4. As already described by way of introduction, the compression spring 13 is coaxially clamped within the governor housing 5 between the shoulders 11 of the control piston 8 and of the insert 12. For the purpose of being fastened in the valve accommodating body, the open front side of the governor housing 5 is provided with the above-mentioned collar 19. The insert 12 has a shoulder 11 which essentially is shaped like a collar and extends inwards in the radial direction. The pressure medium passages 9 are distributed symmetrically around the circumference of the governor housing 5 and of the control piston 8.

Figure 3:
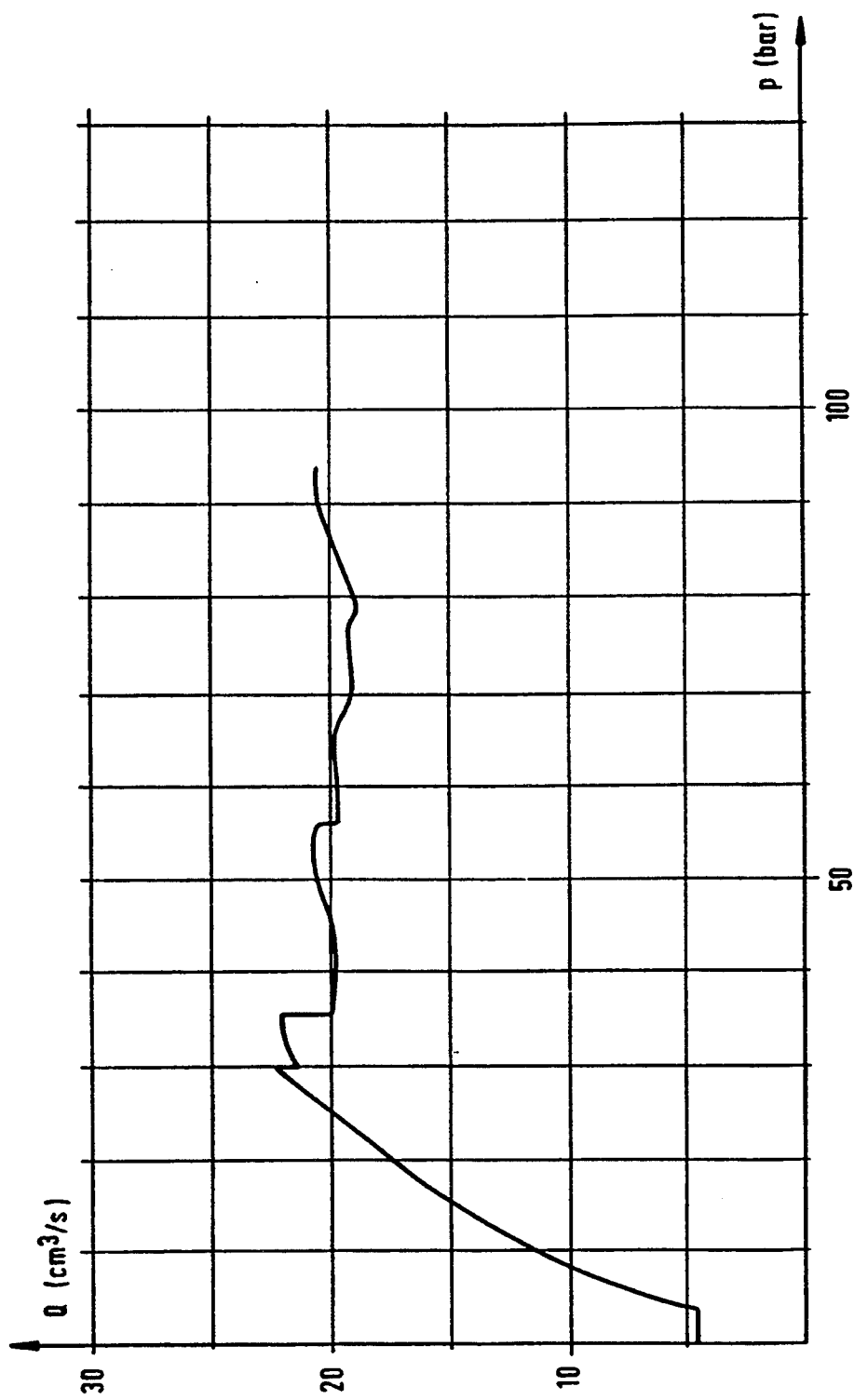
FIG. 3 is a measurement record, illustrating the volume flow as a function of the pressure.

FIGS. 3 and 4 show measurement diagrams relating to volume flow control as functions of the hydraulic pressure and the valve opening time respectively.

The curve of the characteristic line in FIG. 3 illustrates the operating pressures along the abscissa while the ordinate illustrates the volume flow as a function of the pressure traced along the abscissa. This diagram reveals that, during volume flow control and the subsequent stroke movement of the control piston, it is possible to keep the desired volume flow of approximately 20 cc./sec. almost constant and, hence, independent of any pressure changes as early as of a pressure of about 30 bar.

The diagram as per FIG. 4 shows the pulse volume, traced on the ordinate, as a function of the pulse length of the solenoid valve traced on the abscissa. The appertaining characteristic lines represent different operating pressures (70, 90, 100 bar). It becomes evident that, with identical pulse lengths, it is possible to adjust a constant pulse volume which will be almost independent of differing operating pressures so that the high control quality requirements on the volume governor are met to their full extent.

Mode of Operation

In the following, the mode of operation of the volume governor in dependence on the respective valve operating position will be described, reference being made to the afore-explained Figures.

In the open valve operating position, there exists an uncontrolled pressure medium communication from the pressure medium source, such as from a braking pressure generator, to the annular chamber 18 of the valve accommodating body 3 so that, with a relatively small pressure and volume flow, the completely open pressure medium passages 9 permit the pressure medium to reach unhindered the opening of the insert 12 and, thus, the second pressure medium connection 20 via the open valve seat 7 in order to apply the pressure medium to the consumer such as a wheel brake. In accordance with Bernoulli, however, a pressure difference will form in the direction of flow within the control piston 8 as the dynamics of the head of the liquid increases. The amount of said pressure difference will be greater than the pressure of the compression spring 13 acting on the control piston 8. Automatically, in consequence of the increased pressure the control piston 8 will perform a stroke movement opposed to the compression spring 13 causing the pressure medium passages 9 to be covered, at least partially, thus causing the volume flow to be controlled during the electromagnetically non-excited open-valve operating position.

As soon as the valve closure member 2 interrupts pressure medium communication between the first and second pressure medium connections (1, 20) because of electric excitation of the solenoid valve, the pressure compensation inside the control piston 8 will cause the same to abut on the cup-shaped front area of the governor housing 5 under the action of the compression spring 13. Thus the passage 9 will expose the maximum passage cross-section until a renewed onset of an electric valve-operating pulse.

Concluding, reference is made to the fact that, with regard to the noise damping measure mentioned at the beginning, the claimed volume governor is not only characterized by the elimination of the valve operating noises but also features a design which is small as compared with conventional volume governors and which is mass-reduced, particularly so if plastic parts are used, since inside the control piston 8, in particular, it is also possible to do without the requirement of the orifices customarily used with volume governors. Thus, with a minimum inertia of the control piston 8, preconditions for an almost loss-free flow rate are provided as has the precondition for a corresponding control speed, without having to change the solenoid valve essentially. This will automatically imply a considerable improvement in control quality for the overall system independently of the respective hydraulic system connected. Moreover, it is possible to economize considerably on the rating of the electronic power unit operating the solenoid valves.

What is claimed:

1. A solenoid valve for slip-controlled brake systems of automotive vehicles comprising:

a valve closure member guided in a valve accommodating body and provided with an armature, said valve closure member controlling communication between a first pressure medium connection associated with a pressure medium source and a second pressure medium connection associated with a pressure medium consumer;

a volume flow governor accommodating said valve closure member, said volume flow governor being integrated in the valve accommodating body and connected in series connection between the first pressure medium connection and the valve closure member, to provide a constant volumetric flow of said pressure medium, wherein said volume flow governor includes a variable restriction orifice, wherein said orifice is located between said first pressure medium connection and said valve closure member, wherein said volume flow governor includes a cup-shaped governor housing, the opening of said housing directly facing a valve seat cooperating with said valve closure member, an essentially sleeve-shaped control piston introduced into said opening so as to be longitudinally movable, with unthrottled flow passage over its entire length, wherein said control piston and said governor housing have radial pressure medium passages in the end area of their surfaces distal to said valve closure member, said passages provided with control edges cooperating with each other for maintaining a constant volume flow.

2. A solenoid valve as in claim 1, wherein an opening of said control piston is narrowed in the area of said pressure medium passages by means of an inwardly and radially spreading shoulder.

3. A solenoid valve as in claim 2, further comprising: an insert lying coaxially opposite said control piston; and a compression spring clamped between said shoulder and said insert.

4. A solenoid valve as in claim 3, wherein between said insert and said control piston, a distance is formed which, in the direction of a stroke of said control piston, corresponds to at least the smallest inside width of said pressure medium passages.

5. An apparatus for regulating the volumetric flow of a pressurized fluid from a pressure fluid source to a pressure fluid consumer within a hydraulic system, comprising:

a valve with a valve closure member and a volume flow governor accommodated in a valve body;

said valve body having an annular chamber with intake and outlet fluid passages, from said pressure fluid source and to said fluid pressure consumer, respectively;

said valve closure member being in fluid communication in said annular chamber with said intake and said outlet fluid passages;

said volume flow governor being operatively coupled between said valve closure member and said intake fluid passage, said volume flow governor having a variable restriction orifice therethrough;

whereby propagation of fluid pulsations through said apparatus is reduced without generally altering the volumetric flow rate of said pressure fluid through said hydraulic system;

wherein said volume flow governor has a governor housing, disposed within said chamber, said housing having an enclosed end distal to said valve closure member and an open end proximal to said valve closure member;

wherein said volume flow governor includes a control piston movably disposed within said housing proximal to said enclosed end thereof, said housing and said control piston defining said flow passage and said control piston being adapted to operatively throttle the volume of said pressure fluid passing through said flow passage;

wherein said volume flow governor further includes an insert disposed within said housing proximal to said valve closure member and spaced apart from said control piston a distance substantially equal to the cross-section of said unthrottled flow passage.

6. The apparatus of claim 5, wherein said volume flow governor further includes a compression spring and wherein said control piston and said insert have first and second cavities, respectively, creating first and second shoulders with said compression spring being held therebetween.

* * * * *